US012690510B2

(12) United States Patent
Troebner et al.

(10) Patent No.: US 12,690,510 B2
(45) Date of Patent: Jul. 28, 2026

(54) AGRICULTURAL DISTRIBUTION MACHINE FOR SPREADING GRANULAR MATERIAL

(71) Applicant: Amazonen-Werke H. Dreyer SE & CO. KG, Hasbergen (DE)

(72) Inventors: Michael Troebner, Osnabrück (DE); Victor Schwamm, Osnabrück (DE)

(73) Assignee: AMAZONEN-WERKE H. DREYER SE & CO. KG, Hasbergen (DE)

( * ) Notice: Subject to any disclaimer, the term of this patent is extended or adjusted under 35 U.S.C. 154(b) by 132 days.

(21) Appl. No.: 18/285,780

(22) PCT Filed: Mar. 25, 2022

(86) PCT No.: PCT/EP2022/057869
§ 371 (c)(1),
(2) Date: Oct. 5, 2023

(87) PCT Pub. No.: WO2022/214333
PCT Pub. Date: Oct. 13, 2022

(65) Prior Publication Data
US 2024/0206371 A1      Jun. 27, 2024

(30) Foreign Application Priority Data

Apr. 8, 2021      (DE) ..................... 10 2021 108 727.9

(51) Int. Cl.
*A01C 7/08*           (2006.01)
*A01C 15/04*          (2006.01)

(52) U.S. Cl.
CPC .............. *A01C 7/084* (2013.01); *A01C 15/04* (2013.01)

(58) Field of Classification Search
CPC ........................ A01C 7/081–084; A01C 15/04
(Continued)

(56) References Cited

U.S. PATENT DOCUMENTS 5,265,547 A      11/1993  Daws
9,295,191 B2*    3/2016   Jagow .................... A01C 7/082
(Continued)

FOREIGN PATENT DOCUMENTS

AU           4969679 A        2/1980
CN        202565717 U       12/2012
(Continued)

OTHER PUBLICATIONS

German Search Report for German Application No. DE 102021108727.9 dated Dec. 22, 2021.
(Continued)

*Primary Examiner* — Joseph A Dillon, Jr.
(74) *Attorney, Agent, or Firm* — Potomac Law Group, PLLC; John (Jack) J. Penny, Jr.

(57)           ABSTRACT

Agricultural distribution machine for spreading granular materials comprising a storage container for storing the granular materials, several distribution units to which the granular materials can be supplied independently of one another and in an adjustable manner via a delivery line starting out from the storage container, where the distribution units have a plurality of distribution lines, where a device is provided along the distribution lines and is configured to discharge the granular materials, which can be delivered via the distribution lines by two distribution units and which can be introduced via several inlets of the device, via an outlet formed on the device in the direction of at least one spreading element. In order to further improve the spreading process of granular material, it is provided that the device has a further outlet via which the granular materials can be discharged at least in part in the direction of the spreading element, and in that the materials that can be introduced via at least two inlets can be discharged in an
(Continued)

adjustable manner, firstly, merged through one of said outlets and, secondly, through separate outlets.

11 Claims, 8 Drawing Sheets

(58) Field of Classification Search
USPC ......................................................... 111/175
See application file for complete search history.

(56) References Cited

U.S. PATENT DOCUMENTS

| | | | | |
|---|---|---|---|---|
| 9,686,907 | B2 | 6/2017 | Hui et al. | |
| 10,470,357 | B2 * | 11/2019 | Rice ..................... | A01C 21/005 |
| 10,942,053 | B2 * | 3/2021 | Nedved ................ | A01C 15/006 |
| 11,305,951 | B2 * | 4/2022 | Harmon ................. | A01C 7/081 |
| 11,758,835 | B2 * | 9/2023 | Harmon ................. | A01C 7/102 |
| | | | | 111/176 |
| 12,193,353 | B2 * | 1/2025 | Wien ..................... | A01C 7/084 |
| 12,514,150 | B2 * | 1/2026 | Ryan ..................... | A01C 7/084 |
| 12,557,728 | B2 * | 2/2026 | Smith .................... | A01C 15/02 |
| 2005/0103244 | A1 | 5/2005 | Mayerle et al. | |
| 2007/0048434 | A1 | 3/2007 | Mayerle et al. | |
| 2018/0206400 | A1 * | 7/2018 | Bedosti .................. | A01C 15/04 |
| 2018/0317379 | A1 * | 11/2018 | Pirkenseer ............. | A01C 7/084 |
| 2018/0343792 | A1 * | 12/2018 | Roberge ................. | A01C 7/082 |
| 2023/0380331 | A1 * | 11/2023 | Thompson .............. | A01C 7/06 |
| 2024/0279005 | A1 * | 8/2024 | Kale ..................... | A01C 7/107 |
| 2025/0081877 | A1 * | 3/2025 | Smith .................. | A01C 15/006 |
| 2025/0341413 | A1 * | 11/2025 | Nedved ................. | G01F 13/001 |

FOREIGN PATENT DOCUMENTS

| | | | | |
|---|---|---|---|---|
| DE | 10121910 | A1 | 11/2002 | |
| DE | 102018130717 | A1 * | 6/2020 | .......... A01C 21/005 |
| DE | 102019122913 | A1 | 3/2021 | |

OTHER PUBLICATIONS

International Search Report for International Application No. PCT/EP2022/057869 dated Jul. 26, 2021 (includes English language translation).
Office Action for Chinese Patent Application No. 202280041080.8 mailed on Aug. 14, 2025.

* cited by examiner

AGRICULTURAL DISTRIBUTION MACHINE FOR SPREADING GRANULAR MATERIAL

CROSS REFERENCE TO RELATED APPLICATIONS

The present application claims priority under 35 U.S.C. § 365 to PCT/EP2022/057869 filed on Mar. 25, 2022 and under 35 U.S.C. § 119(a) to German Application No. 10 2021 108 727.9 filed on Apr. 8, 2021.

BACKGROUND

The disclosure relates to an agricultural distribution machine for spreading granular materials. A plurality of variants of towed, mounted, and/or self-propelled working machines is known in the field of agriculture. These include, inter alia, agricultural distribution machines that are suitable for spreading and/or depositing granular materials, in particular seed and/or fertilizer, onto arable agricultural land. Such distribution machines are known, for example, in the form of pneumatic and/or mechanical seeders and/or fertilizer machines and/or precision seeders. Depending on the requirements, the granular materials are typically composed of the same or different varieties and/or types of, in particular granular, seed and/or fertilizer and are provided for placement on the arable agricultural land and/or in at least a furrow formed for this purpose, in particular by the distribution machine.

Such an agricultural distribution machine is described, for example, in DE 101 21 910A1. According thereto, the distribution machine comprises at least one storage container for storing the granular materials and several distribution units, in particular at least in part in the form of a segment of a circle and/or in the manner of a distributor head. At least one of the granular materials can there be supplied to the respective distribution units independently of one another and in an adjustable manner via at least one delivery line which starts out from the storage container and can be acted upon in particular pneumatically. The distribution units furthermore have a plurality of distribution lines arranged thereon, in particular radially, where at least one device is provided along the distribution lines, by way of which the suppliable granular materials can be influenced. The at least one device is configured there to discharge the granular materials, which can be delivered via distribution lines by at least two distribution units and be introduced via several inlets of the device, via at least one outlet formed on the device in the direction of at least one spreading element, which is configured in particular in the manner of a colter assembly.

Distribution machines with at least one corresponding switchable device arranged along the distribution lines for selectively merging distribution lines are known in particular from U.S. Pat. No. 5,265,547 A.

Such distribution machines with corresponding devices already allow for granular materials that can be supplied from several distribution units to be merged least in part and to discharge and/or deposit them in a manner merged at least in part via at least one spreading element. In particular, it can be determined by way of switchable devices in a selectable manner toward which of several spreading elements the granular materials can be discharged.

SUMMARY

In a plurality of such spreading processes, the spreading could be improved even further if the suppliable materials can not only be merged with such devices, but can also be discharged and/or spread to different positions on the at least one spreading element, at least in part in a separate or merged manner, as required.

This object can be satisfied according to the disclosure in that the device has at least one further outlet via which the granular materials can be discharged at least in part in the direction of the spreading element, and in that the materials that can be introduced via at least two inlets can be discharged in an adjustable manner, firstly, merged through one of said outlets (32A, 32B) and, secondly, through separate outlets (32A, 32B).

As a result of this measure, the granular materials can be supplied to the at least one spreading element in a manner merged or separated at least in part. The device is preferably configured to be switchable at least in part manually by an operator or alternatively in an automated manner by an associated open-loop and/or closed/loop control system. The granular materials can be spread and/or deposited at least one spreading element at the same position or on different positions, in particular at different depth levels, on the arable land and/or in the furrow. In order to deliver the granular materials from at least one device to the spreading element, a spreading line is preferably arranged between each of the outlets of the device and the spreading element.

The at least one spreading element is preferably configured in the manner of a colter assembly with at least one colter, in particular a tine and/or disk colter, where the respective outlets of the device are associated with the spreading element, in particular with the at least one colter. Alternatively or additionally, the spreading element also has several colters, in particular arranged one behind the other, next to one another, and/or offset from one another, where at least two of the colters are associated with at least one spreading line, in particular in the form of at least one shot tube. Alternative or additionally, several spreading lines can be associated with at least one colter, where the respective outlets of the spreading lines are preferably arranged on different heights of the colter.

Unless explicitly stated otherwise, the term "granular materials" hereafter refers to seed and/or fertilizer suitable for agricultural cultivation which is configured and/or used in particular in granular form. The term seed and/or fertilizer is also understood to mean seed/or fertilizer of different quality, variety, and/or type. For example, this is to be understood to mean a spreading process in which solely seed or solely fertilizer is spread, where the respective seed or fertilizer differs in quality, variety, and/or type. For example, a main seed and, in parallel, a secondary seed, in particular in the form of catch fruit such as legumes, can also be sown and/or deposited. This is alternatively or additionally also to be understood to mean joint spreading of at least one seed and at least one fertilizer. It is beyond that conceivable that, parallel to the granular or grainy seed, at least partially liquid fertilizer and/or other substances such as bacterial cultures can be supplied to and/or deposited by the spreading elements, where at least one of the several distribution units is configured to distribute/and or deliver the partially liquid fertilizer and/or other substances, such as bacterial cultures, via the respective distribution lines.

In a preferred embodiment of the distribution machine according to the disclosure, the device comprises at least one switch device which is in particular pivotable and/or rotatable at least in part and which can be made to assume at least two, preferably up to five or more, different positions, where the granular material can be discharged from the device as a function of the position which, in particular is switchable.

The switch device is preferably configured to be rotatable about an axis of rotation that is formed to be at least substantially perpendicular and/or vertical in relation to a direction of delivery of the granular material. An adjustment and/or pivot angle of, in particular, approximately 45° up to 90° or more is particularly preferred. In addition, the switch device is preferably configured in the manner of an adjustable switch point or barrier. In particular, the device is configured by such a switch device to discharge the granular material in a first position via separate outlets of the device and in at least one further, in particular second or third, position, optionally via one of the several outlets. Particularly high flexibility and/or functionality of the device is obtained by such an embodiment.

Furthermore, an embodiment of the distribution machine according to the disclosure is preferred in which the device can be made to assume and/or be operated in at least one, in particular further, intermediate position. Within the intermediate position, the granular materials can be discharged, in particular simultaneously and/or in parallel, via at least one of the outlets in a manner merged at least in part and via at least one other outlet in a separated manner. In other words, during the intermediate position, the materials which can be introduced into the switchable device are discharged via at least one of the outlets in a form that is mixed at least in part, while at least one of the granular materials is discharged via at least one other outlet in a form that is at least almost unmixed. Furthermore, at least one intermediate position of the switch device, in particular a switch point, is preferred, which is associated with a defined mixing ratio of the granular materials. For example, depending on the adjustable and/or adjusted pivot angle, a mixing ratio of the different materials of about one to four, two to four, and/or three to four can be set. With such an embodiment, the variation of different options for supplying granular materials to the spreading element is increased even further.

In a further development of the distribution machine according to the disclosure, the size, in particular the respective cross sections, and/or an orientation of the outlets correspond at least approximately to those of the, in particular associated, inlets. The respective cross sections of the inlets as well as of the outlets are formed preferably to be equal at least approximately, in particular with regard to their size and/or shape Alternatively or additionally, the respective outlets are each associated with an inlet, in particular in a basic position of the switch device, where the respective outlets and inlets associated with one another are formed preferably to be equal at least approximately. Furthermore, the inlets and outlets are preferably formed at an angle to the actual direction of delivery of the granular material resulting within the device, where the angles of the inlets, in particular the introduction angles, correspond at least approximately to the angles of the, in particular associated, outlets, in particular to the discharge angles. In particular, when viewed in a top view, the device is X-shaped at least in part and/or substantially. As a result of such an embodiment, the granular materials can be supplied and/or delivered via the distribution lines at least almost without being influenced, in particular in terms to the direction of delivery and/or delivery speed. Operational reliability of such a device is therefore increased in a particularly simple manner The at least one device of the distribution machine according to the disclosure is also preferably configured to be at least almost mirror-symmetrical, where a longitudinal axis and/or central axis of the device preferably forms the mirror axis. The inlets and/or outlets of the device are preferably formed at an angle in relation to the longitudinal or mirror axis. Alternatively or additionally, a section of the device arranged between the inlets and outlets is configured correspondingly, in particular at least almost parallel, to the longitudinal axis of the device and/or the direction of delivery of the granular materials within the device.

In another preferred embodiment of the distribution machine according to the disclosure, at least one actuating element is associated with the switch device and is preferably arranged at the device, in particular at the switch device, and can be actuated without tools. The actuating element is preferably configured in the manner of a lever and/or is connected directly to the switch device. Particularly preferably, the actuating element is configured at least in part in the manner of a spring wire and/or is coupled to the switch device by way of at least one fastening element, in particular a screw device. Alternatively or additionally, the at least one switch device can be actuated, in particular in an automated manner and/or remotely, by way of an actuator. If several devices and/or switch devices are used, then the switch devices and/or actuating elements can preferably be actuated individually or alternatively and/or additionally as a group. Alternatively or additionally, at least one common actuating element is furthermore associated with several switch devices, where the switch devices are switchable and/or adjustable together by actuating the actuating element. A particularly simple operation and/or adjustment of the device to the respective application process is achieved by way of such an embodiment.

In another development of the distribution machine according to the disclosure, the actuating element can be affixed in a positive-fit and/or force-fit manner, preferably in defined positions in the manner of a snap and/or latch connection and/or along at least one guide link associated thereto. The defined positions of the actuating element are preferably specified at the factory and are each associated with a respective position of the switch device. In a first position of the actuating element and a first position of the switch device associated therewith, the granular materials can be discharged in an at least almost separated manner via separate outlets of the device. In a preferred second position of the actuating element and a second position of the switch device associated therewith, the granular materials can be discharged together in a merged manner via at least one of the outlets. In a preferred third position of the actuating element and a third position of the switch device associated therewith, the granular materials can be discharged together in a merged manner via at least another one of the outlets. Furthermore, at least one further position of the actuating element which is associated with at least one further position, in particular an intermediate position, of the switch device is preferred. During such a position, in particular an intermediate position, at least one of the introducible granular materials can be admixed at least in part to the other introducible granular material. In other words, at least one of the granular materials in the intermediate position is discharged both individually or at least almost in pure form from at least one of the outlets as well as merged at least in part with another granular material via at least one other outlet.

In addition, the actuating element can alternatively or additionally be affixed in one of the respective positions by way of at least one fastening device, in particular a screw device. The actuating element is particularly preferably configured such that it can be formed to be prestressed and/or be prestressed within at least one defined position.

A distribution machine according to the disclosure preferably comprises several, in particular switchable, devices which are each associated with at least two distribution lines of different distribution units and several spreading elements, in particular arranged to be transverse to and/or one behind the other in a direction of travel. In particular, at least one, preferably switchable, device is associated with each spreading element. The granular materials that can be supplied from different distribution units can therefore be discharged via a first device to a first spreading element and via at least one further device to at least one further spreading element.

In a further preferred embodiment of the distribution machine according to the disclosure, the devices are arranged together, in particular next to one another, on a retaining device, where the respective actuating element of the device can preferably be affixed on the retaining device, in particular on a guide link formed thereon. Several guide links or guide tracks are there preferably formed next to one another on the retaining device, where the actuating elements are arranged at least in part so as to protrude through a respective guide link or guide track. The respective guide links or guide tracks are particularly preferably configured such that the actuating element can be affixed to the retaining device at least one end of the guide track in a positive-fit and/or force-fit manner and/or in a prestressed manner. In addition, the retaining device is preferably configured in the manner of a retaining rail and/or a retaining profile, in particular a U profile.

BRIEF DESCRIPTION OF THE DRAWINGS

Further details of the disclosure can be gathered from the description of the examples and the drawings. where the drawing in FIG. 1 show an embodiment of an agricultural distribution machine according to the disclosure in a perspective view from behind.

DETAILED DESCRIPTION

Figure 1:
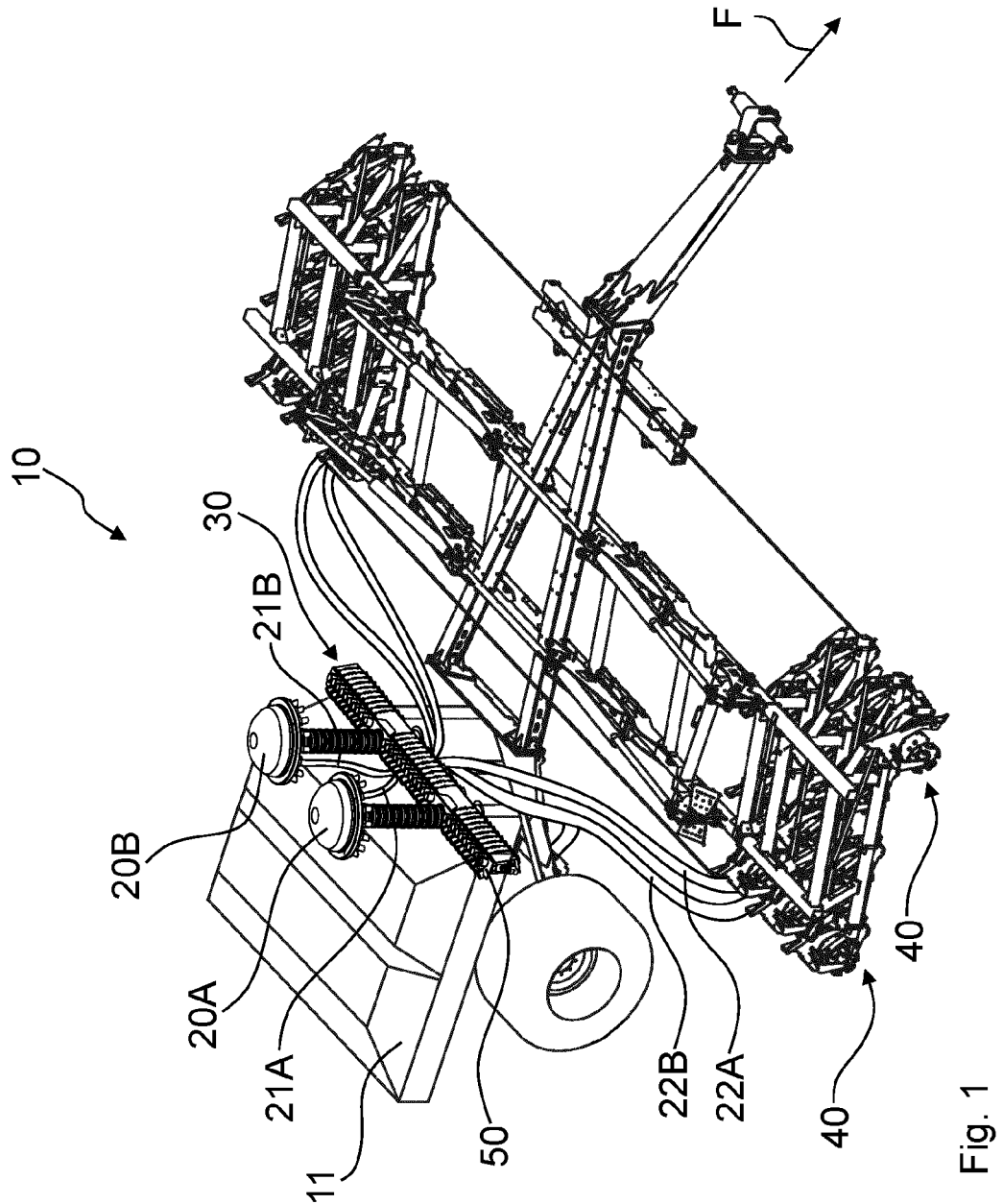

An agricultural working machine configured as a distribution machine 10, in particular as a pneumatic seeder, for spreading granular materials M1, M2, in particular seed and/or fertilizer, is shown in FIG. 1. It can be seen that distribution machine 10 is configured as a working machine 10 that can be towed in a direction of travel F. As an alternative thereto, distribution machine 10 can also be configured according to other types of agricultural distribution machines, for example, as a mounted, carried and/or self-propelled seeder and/or fertilizer machine.

As can furthermore be seen, distribution machine 10 shown comprises at least one, in particular two, storage containers 11 for storing granular materials M1, M2, where a storage container 11 with several chambers for receiving different or identical granular materials M1, M2 is alternatively or additionally also conceivable. Furthermore, distribution machine 10 comprises several distribution units 20A, 20B, in particular at least in part in the form of a segment of a circle and/or in the manner of a distributor head. Granular materials M1, M2 can there each be supplied via an internal delivery system (not shown in the figures), in particular with at least one pneumatically actuatable delivery line 12 starting out from storage container 11 and/or a metering unit associated with storage container 11, to distribution units 20A, 20B independently of one another and in an adjustable manner. Alternatively or additionally, only one, in particular common, metering unit is also conceivable when using same materials M1, M2, where the metering unit has several outlets, in particular in the manner of a double lock or a double injector, via which respective materials M1, M2 can be introduced into different respective delivery lines. Distribution units 20A, 20B also each have a plurality of distribution lines 21A, 21B, in particular arranged radially thereon, where only one distribution line 21A, 21B is shown for every distribution unit 20A, 20B in the embodiment for reasons of clarity.

Figure 2:
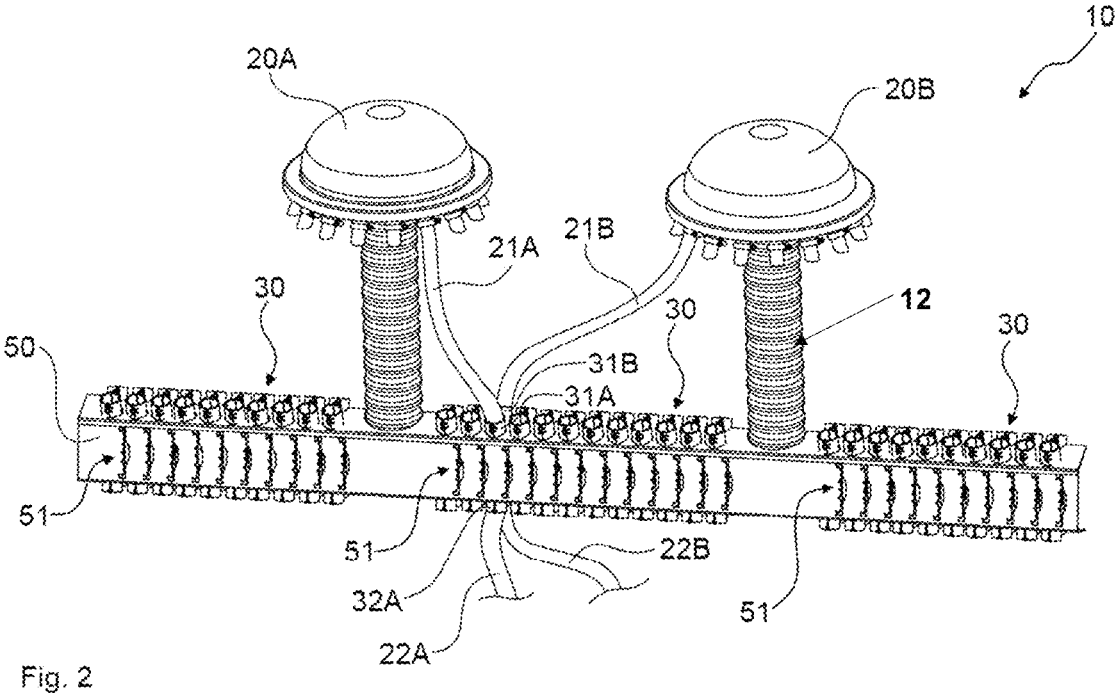
FIG. 2 show several devices according to the disclosure for selectively merging distribution lines from different distribution units in the installed state in a close-up view.

Furthermore, provided and/or arranged along distribution lines 21A, 21B are, in particular, switchable devices 30 which can be seen better in FIG. 2, and which are configured to discharge granular materials M1, M2, which can be delivered via distribution lines 21A, 21B by at least two distribution units 20A, 20B and introduced via several inlets 31A, 31B of device 30, via at least one outlet 32A, 32B formed on device 30 in the direction of at least one spreading element 40, in particular formed in the manner of a colter assembly. As can be seen in FIG. 2, device 30 is arranged in multiple embodiments on a common retaining device 50, in particular a retaining rail and/or a retaining profile formed to be U shaped. Each device 30 is associated with two distribution lines 21A, 21B of different distribution units 20A, 20B and/or configured to merge at least two respective distribution lines 21A, 21B of different distribution units 20A, 20B as desired. As an alternative thereto, only one device 30 can also be arranged between distribution units 20A, 20B and spreading elements 40 along distribution lines 21A, 21B.

Figure 3:
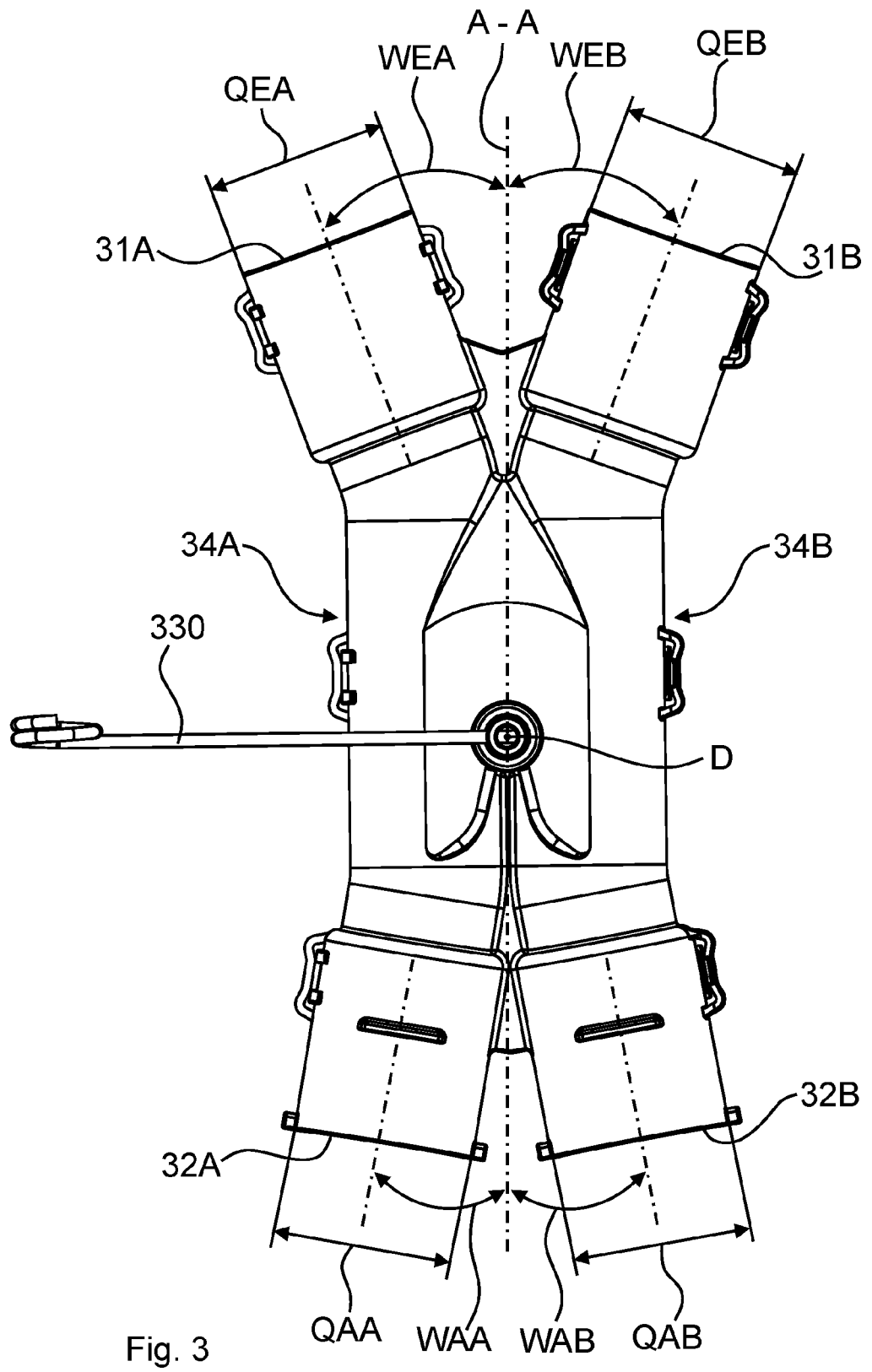
FIG. 3 show the device according to the disclosure for selectively merging distribution lines in an enlarged individual view.

FIG. 3 shows device 30 according to the disclosure in the non-installed state. Device 30 accordingly has at least one further, in particular second, outlet 32A, 32B via which granular materials M1, M2 can be discharged at least in part in the direction of spreading element 40. Granular materials M1, M2 can be introduced via at least two inlets 31A, 31B and can be discharged in an adjustable, in particular selectable, manner, firstly, merged through one of outlets 32A, 32B and, secondly, through separate outlets 32A, 32B.

The sizes, in particular cross sections QAA, QAB, of respective outlets 32A, 32B correspond at least approximately to the sizes, in particular cross sections QEA, QEB, of respective inlets 31A, 31B. Furthermore, outlets 32A, 32B as well as inlets 31A, 31B are formed to be angled with respect to a longitudinal or mirror axis A-A of device 30 at an angle WAA-WEB. Angles WAA-WEB are all formed to be at least almost equal, in particular in the form of an acute angle, and are approximately 45°, where angles WAA-WEB can alternatively also be obtuse angles or differ from one another.

Figure 4A:
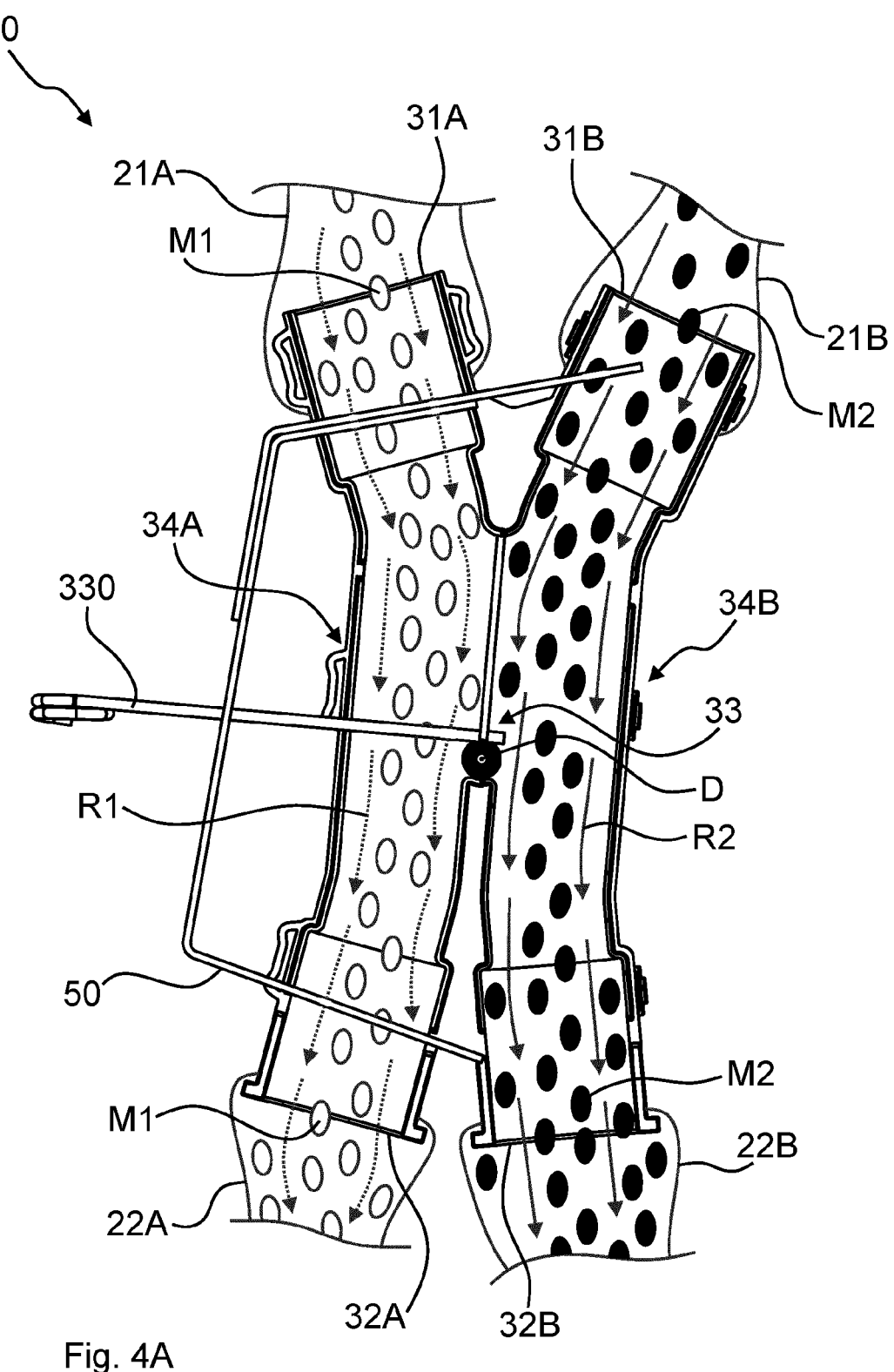
FIG. 4A show the device from FIG. 3 with a switch device in a first position and in a sectional view.

The interior of device 30 can be seen in the sectional view of FIG. 4A. The, in particular switchable, device 30 has at least one switch device 33 which is in particular at least in part pivotable and/or rotatable. Switch device 33 is shown in a first position, in particular a basic setting of device 30. During the first position, in particular the basic setting, granular materials M1, M2 that can be introduced via respective inlets 31A, 31B are discharged via separate outlets 32A, 32B. The respective device is connected to at least one distribution line 21A, 21B of different distribution units 20A, 20B, in particular distributor heads, in a material-conveying manner at inlets 31A, 31B, where a first inlet 31A is connected in particular to a distribution line 21A of a first distribution unit 20A and a second inlet 31B is connected to a distribution line 21B of a second distribution unit 20B. A first granular material M1 introduced via first inlet 31A is delivered by device 30, in particular along a first straight section member 34A, and discharged via a first outlet 32A. A second granular material M2 introduced via second inlet 31B is delivered by device 30, in particular along a second straight section member 34B, and discharged via a second outlet 32B. First granular material M1 is supplied to spreading element 40, in particular to a first spreading position, via a first spreading line 22A connected to first outlet 32A and spread and/or deposited onto the arable agricultural land, in particular in a furrow. Furthermore, second granular material M2 is supplied to spreading element 40, in particular to a second spreading position, via a second spreading line 22B connected to second outlet 32A and spread and/or deposited onto the arable agricultural land, in particular in a furrow.

Granular materials M1, M2 are delivered by device 30, in particular pneumatically and/or by an air flow that can be generated within distribution machine 10, in a direction of delivery R1, R2 which corresponds at least substantially to longitudinal and/or mirror axis AA. The delivery, in particular direction of delivery R1, R2, of granular materials M1, M2 are at least almost parallel and/or mirror-symmetrical to one another in the first position, where it is possible to influence the delivery, in particular direction of delivery R1, R2, by switch device 33. For this purpose, switch device 33 is associated with at least one actuating element 330 which is arranged on device 30, in particular directly on switch device 33 and can be actuated without tools and/or manually. Actuating element 330 is there configured in the manner of a lever, in particular a spring wire, and is coupled and/or connected to switch device 33 at least one end. As an alternative or in addition to the embodiment shown, switch device 33 can also be actuated individually and/or in a group with switch devices 33 of other or further devices 30, in particular remotely, by way of an actuator.

Figure 4B:
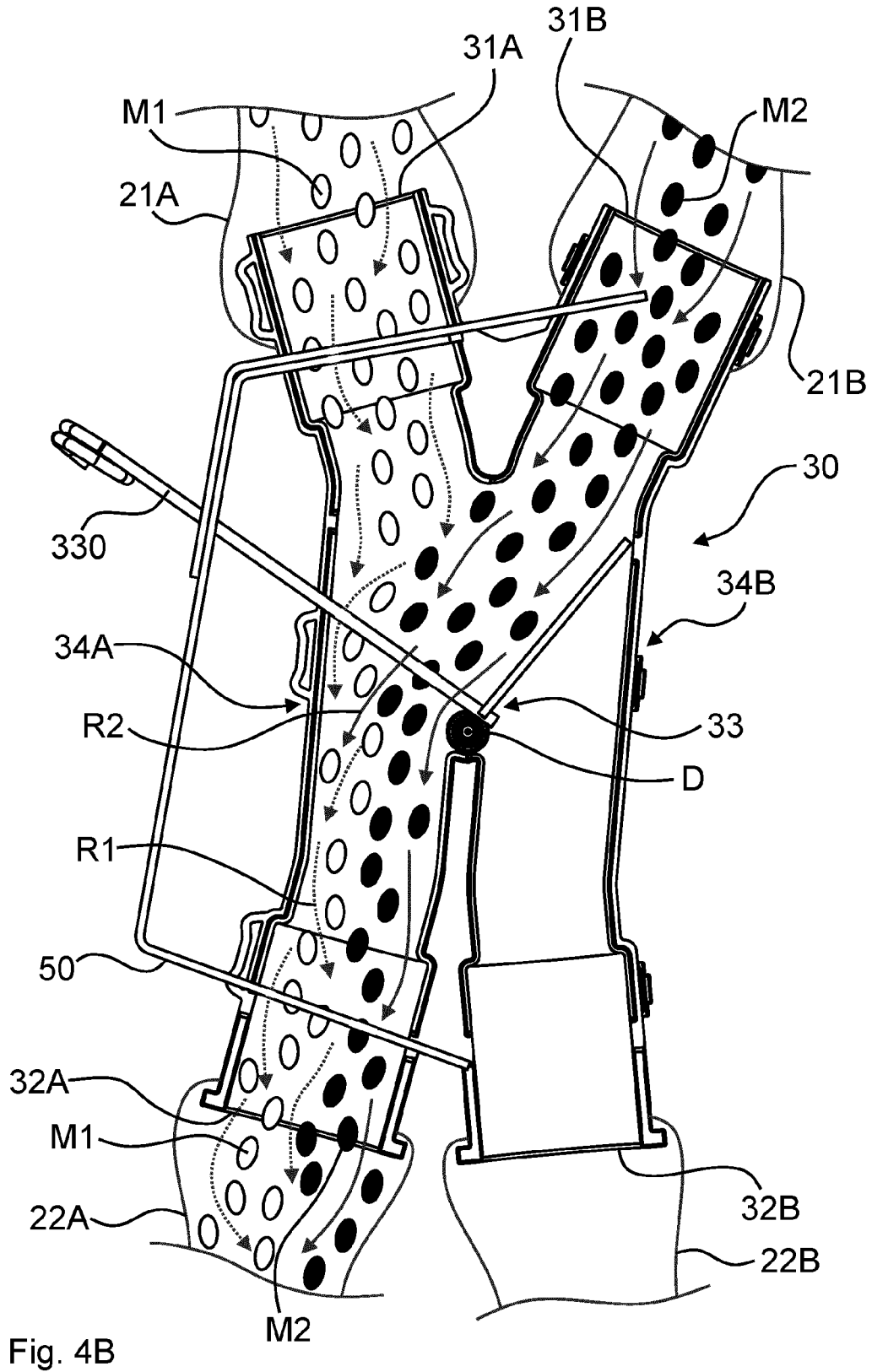
FIG. 4B show the switch device from FIG. 4A in a second position.

FIG. 4B shows an actuated actuating element 330 and a twisted and/or adjusted switch device 33 in a second position. Unlike in the first position, granular materials M1, M2 introduced via inlets 31A, 31B are merged there and discharged together via first outlet 32A. For this purpose, switch device 33 is rotated and/or pivoted about an axis of rotation D by approximately 45° in the clockwise direction. Second granular material M2 introduced via second inlet 31B is therefore redirected within device 30 and/or by switch device 33. Granular materials M1, M2 discharged from first outlet 32A are thus supplied in a merged manner to spreading element 40, in particular to a first of several discharge positions, and from there dispensed and/or deposited onto the arable land and/or in the furrow.

Figure 4C:
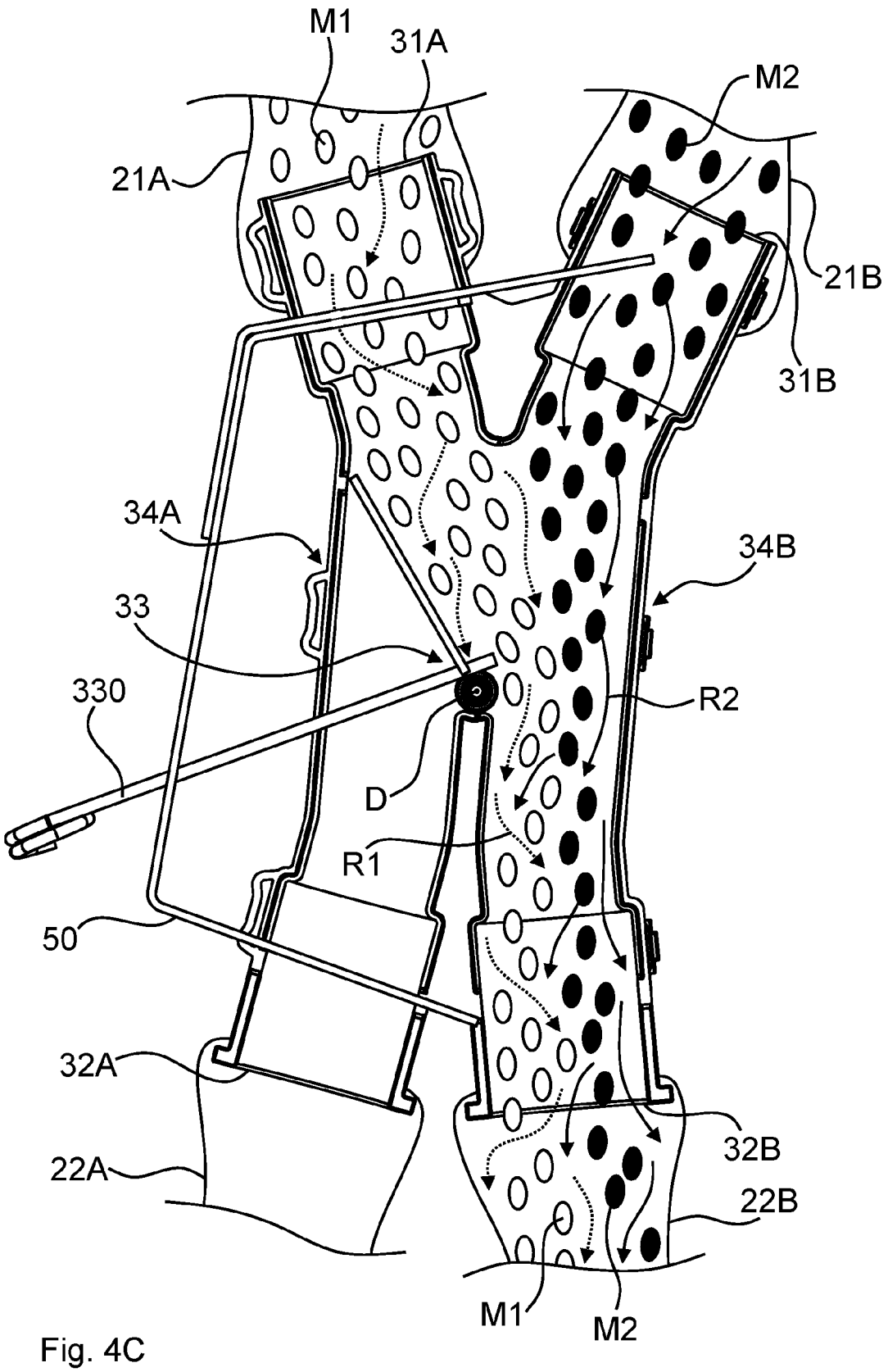
FIG. 4C show the switch device from FIG. 4A in a third position.

A further, in particular third, position of switch device 33 is shown in FIG. 4C. Switch device 33 is there rotated and/or pivoted in the counterclockwise direction by about 45° from the first position. Unlike in the first and/or second position, granular materials M1, M2 introduced via inlets 31A, 31B are merged there and discharged together via second outlet 32B. For this purpose, first granular material M1 is now redirected within device 30 and/or by switch device 33. Granular materials M1, M2 thus discharged from second outlet 32B are therefore supplied in a merged manner to spreading element 40, in particular to a second of several discharge positions, and from there dispensed and/or deposited onto the arable land and/or in the furrow.

Figure 4D:
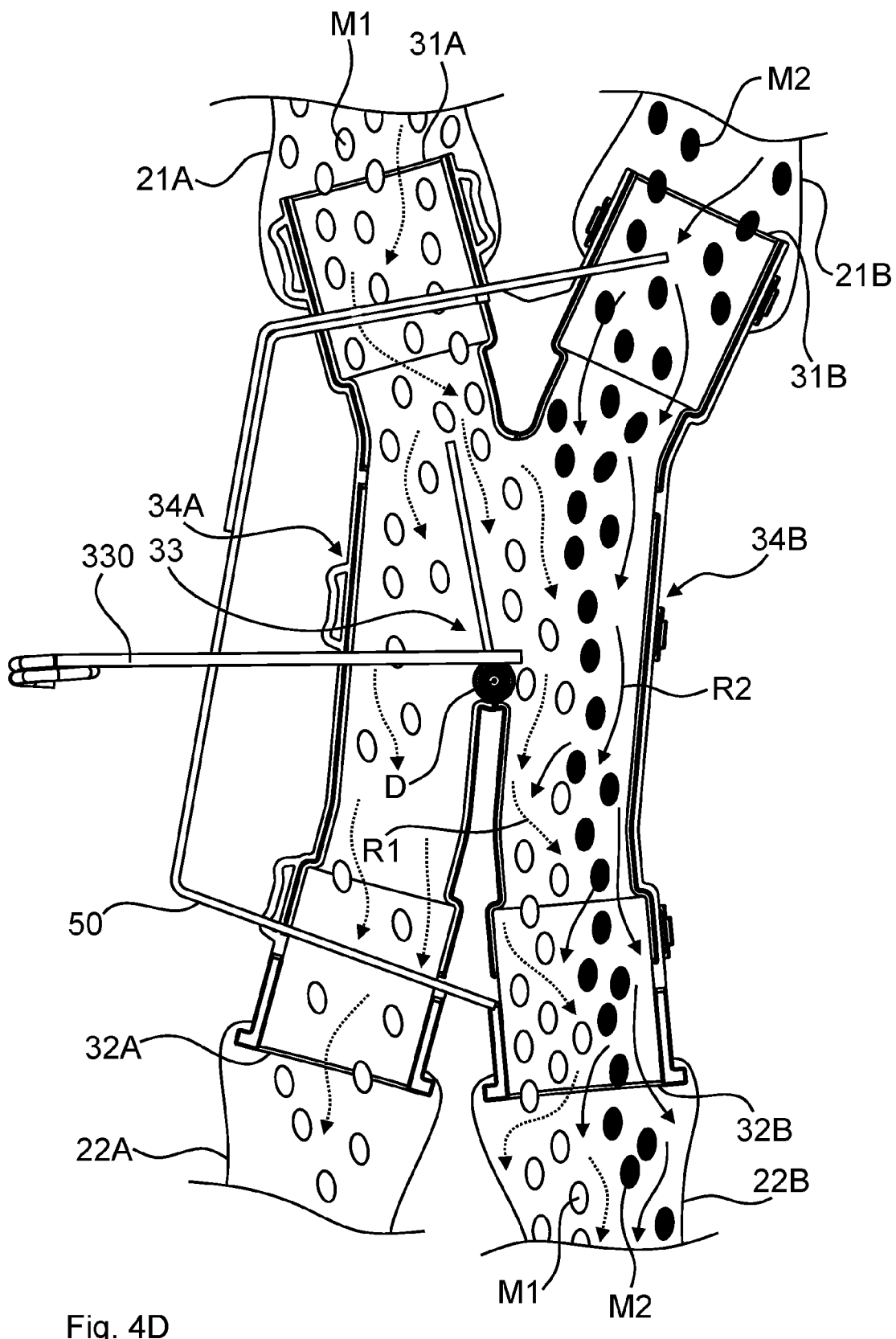
FIG. 4D show the switch device from FIG. 4A in a fourth position.

At least one further possible position or intermediate position of switch device 33 and/or actuating element 330 is shown in FIG. 4D. Switch device 33 can be made to assume an intermediate position, in particular between the first and second or third position, respectively. Unlike in the second and/or third position, granular materials M1, M2 that can be introduced via different inlets 31A, 31B are merged and/or mixed there only in part. In the embodiment shown, a first partial quantity of first granular material M1, which can be adjusted in particular in dependence of the intermediate position, is delivered at least almost uninfluenced by switch device 33 along the first straight section member to first outlet 32A, while a second partial quantity of first granular material M1 is redirected by switch device 33 in the direction of second granular material M2 and thus to second outlet 32B. Depending on the intermediate position and/or pivoting or rotation of switch device, a defined mixing ratio of granular materials M1, M2 is alternatively or additionally conceivable.

In addition, at least one additional intermediate position (not shown) of device 30 and/or switch device 33 is conceivable in which the pivoting or rotation of switch device 33 from the basic position takes place in the direction of rotation opposite to FIG. 4D. In this case, second granular material M2 that can be introduced via second inlet 31B is then only redirected in part by switch device 33 in the direction of first granular material M1 and thus of first outlet 32A.

Figure 5:
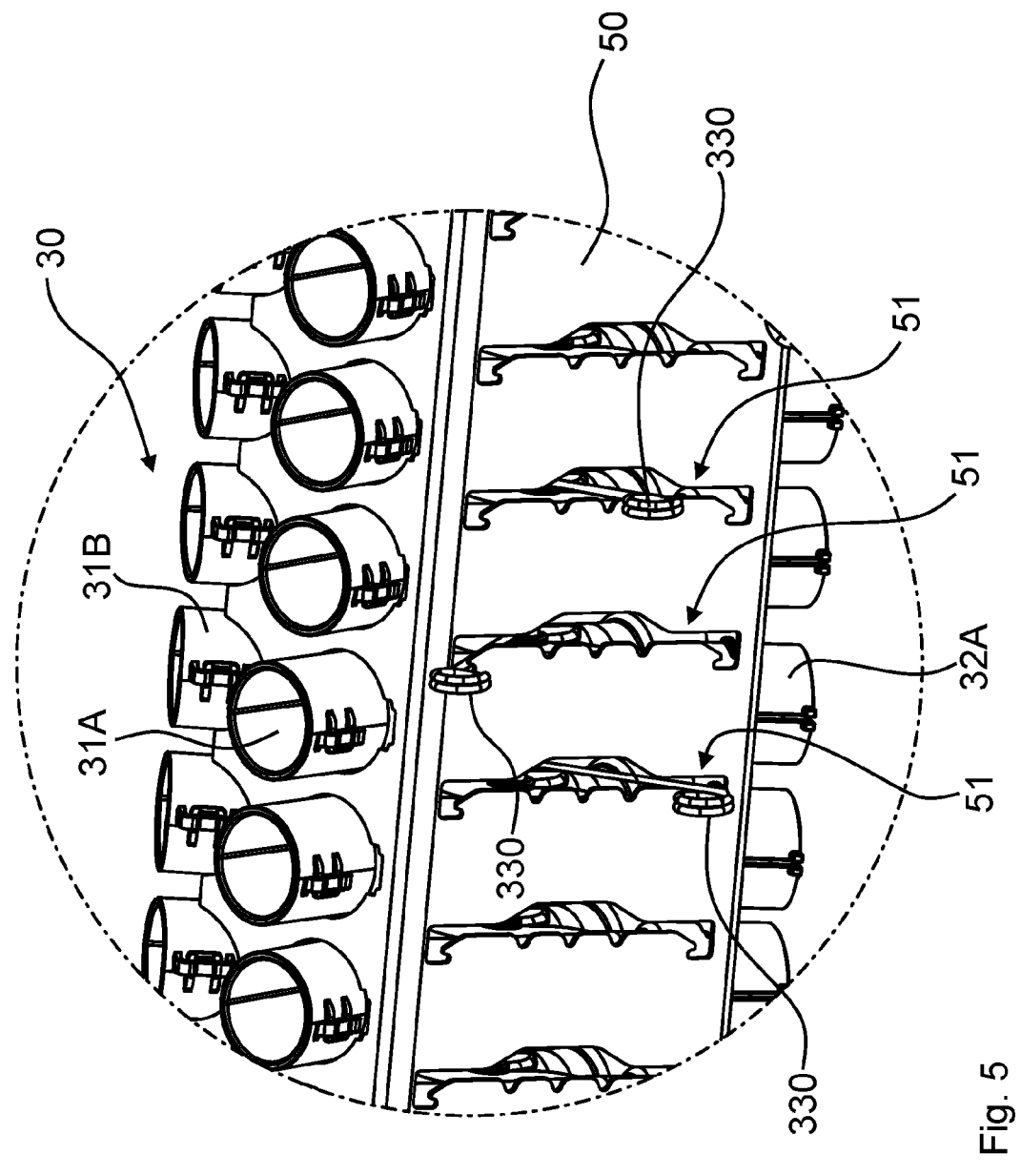
FIG. 5 show the device from FIG. 2 in a detailed view.

Switch device 33 can be affixed by way of actuating element 330, as shown in FIG. 5. Actuating element 330 can be affixed on retaining device 50 in a positive-fit and/or force-fit manner, in particular in defined positions in the manner of a snap and/or latch connection and/or along at least one guide link 51 associated therewith. As can furthermore be seen, guide link 51 is formed on retaining device 50 in the manner of a cutout, in particular a guide track. Actuating element 330 is arranged so as to protrude at least in part through guide link 51 and can be prestressed at least one end of guide link 51. As a result, actuating element 330 can be affixed in at least one, in particular in several different positions, where several or all affixable positions of actuating element 330 are each associated with at least one position of switch device 33.

For particularly easy accessibility, both device 30 as well as guide links 51 and/or actuating elements 330 are arranged next to one another along retaining device 50.

In the embodiment shown, each spreading element 40 comprises at least one colter that can be made to engage with the arable soil, in particular a tine colter and/or disk colter, where spreading element 40 alternatively or additionally has at least one further colter that is disposed, in particular when viewed in the direction of travel F, forward thereof, behind and/or or at the side. Depending on the embodiment variant, the different spreading positions of granular materials M1, M2 can be associated with one colter or with separate colters. The spreading positions can also alternatively or additionally differ in a depositing depth, in particular a height or depth relative to the ground. Furthermore, as an alternative or in addition to the embodiment variant shown, device 30 according to the disclosure can also comprise at least one further outlet and/or inlet. Furthermore, switch device 33 can be made to assume at least one further position as an alternative or in addition to the positions shown.

It goes without saying that the features mentioned in the embodiments described above are not restricted to these special combinations and are also possible in any other combination. Furthermore, it goes without saying that the geometries shown in the figures are only by way of example and are also possible in any other configuration.

LIST OF REFERENCE CHARACTERS

10 agricultural distribution machine
11 storage container
20A first distribution unit
20B second distribution unit
21A, 21B distribution lines
22A, 22B spreading lines
30 device for selectively merging the distribution lines
31A first inlet
31B second inlet
32A first outlet
32B second outlet
33 switch device
330 actuating element
34A first straight section member
34B second straight section member
40 spreading element
50 retaining device
51 guide link
A-A longitudinal axis, mirror axis
D axis of rotation
F direction of travel
M1 first granular material
M2 second granular material
QAA, QAB cross-sections of the outlets
QEA, QEB cross-sections of the inlets
R1, R2 direction of delivery of the granular materials
WAA-WEB angles of the inlets and outlets
The invention claimed is:

1. An agricultural distribution machine for spreading at least two granular materials, comprising:
   at least one storage container for storing said at least two granular materials,
   several distribution units, each formed in the manner of a distributor head, to each of which at least one of said at least two granular materials is supplied independently of one another and in an adjustable manner deliverable via at least one pressurizable delivery line extending from said storage container, where said distribution units have a plurality of distribution lines arranged thereon, where at least one device is provided along said distribution lines and is configured to discharge said at least two granular materials, which are deliverable via at least two distribution lines of said distribution lines by at least two distribution units of said several distribution units and are feedable via several inlets of said at least one device, via at least one outlet formed on said at least one device in the direction of at least one spreading element,
   wherein said at least one device has at least one further outlet via which said at least two granular materials are dischargeable at least in part in the direction of said at least one spreading element, and in that said at least two materials that are feedable via at least two inlets of said several inlets are dischargeable in an adjustable manner, firstly, merged through one outlet of said at least one outlet or said at least one further outlet and, secondly, through at least two separate outlets of said at least one outlet and said at least one further outlet.

2. The distribution machine according to claim 1, wherein said at least one device comprises at least one switch device which is pivotable and/or rotatable at least in part and which is movable into at least two different positions, where said at least two granular materials are dischargeable from said at least one device as a function of the position of the at least one switch device.

3. The distribution machine according to claim 1, wherein a size, a cross sections, and/or an orientation in a direction of conveyance of said granular materials of said separate outlets corresponds at least approximately to those of said at least two inlets.

4. The distribution machine according to claim 2, wherein said switch device is provided with at least one actuating element, wherein the at least one actuating element is actuable without tools.

5. The distribution machine according to claim 4, wherein said at least one actuating element is affixable in a positive-fit and/or force-fit manner.

6. The distribution machine according to claim 4, comprising several devices which are each associated with at least two distribution lines of different distribution units, wherein said devices are arranged together on a retaining device.

7. The distribution machine according to claim 4, wherein the at least one actuating element is arranged on said at least one device.

8. The distribution machine according to claim 4, wherein the at least one actuating element is arranged on said switch device.

9. The distribution machine according to claim 6, wherein said devices are arranged next to one another on said retaining device.

10. The distribution machine according to claim 6, where an actuating element of said devices is affixable on said retaining device.

11. The distribution machine according to claim 10, where said actuating element of said devices is affixable on a guide link formed on said retaining device.

\* \* \* \* \*